March 14, 1933.     T. J. FULTON     1,901,806

ATOMIZER

Filed June 22, 1932

INVENTOR.
Thomas. J. Fulton.
BY Philip A. Minnis
ATTORNEY.

Patented Mar. 14, 1933

1,901,806

UNITED STATES PATENT OFFICE

THOMAS J. FULTON, OF FRESNO, CALIFORNIA, ASSIGNOR TO FOOD MACHINERY CORPORATION, OF SAN JOSE, CALIFORNIA, A CORPORATION OF DELAWARE

ATOMIZER

Application filed June 22, 1932. Serial No. 618,735.

This invention relates to an apparatus for discharging liquids in atomized form, and has particular reference to an apparatus of this character suitable for use in applying liquid insecticides, fungicides, or the like, to fruit trees, vines, bushes or plants to destroy insects or fungus pests.

It is well known that certain destructive insects such as adult vine hoppers are not readily killed by merely wetting them with insecticide, but may be more easily destroyed by applying the insecticide in the form of a very fine mist or spray whereby the insects are poisoned by inhalation of the insecticide.

Furthermore, since certain of the insecticides which have been found most effective for the purpose such as, for example, perithium oil, are quite expensive, it is also desirable from the standpoint of economy to apply them in as finely divided form as possible in order to cover a maximum area.

It has been found that the most effective and economical manner of applying insecticides of this character is to atomize them directly into a high velocity air blast whereby the poison is mixed with the air and may, by the use of a suitable nozzle, be effectively discharged to whatever location desired and to considerable distances, depending upon the strength of the air blast.

It is the principal object of this invention to provide an apparatus for this purpose which is designed to break up the liquid insecticide more finely than has been possible with apparatus heretofore provided, and to shape the discharge blast so as to cover a greater area, whereby the insecticide is more effectively, economically and quickly applied.

With these objects in view, as well as others which will become apparent as the description proceeds, the invention will best be understood by reference to the accompanying drawing, in which.

Figure 1:
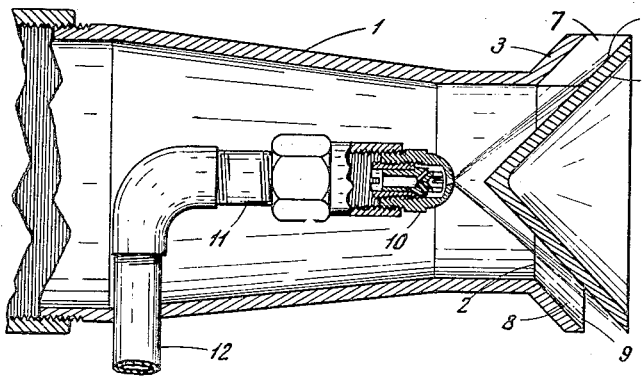
Figure 1 is a sectional elevation through an atomizer nozzle constructed according to the invention.
Figure 2:
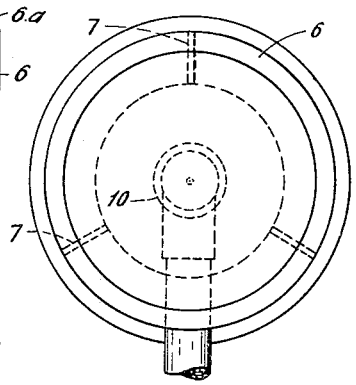
Figure 2 is an end elevation of the nozzle as viewed from the right of Figure 1.

Referring to Figures 1 and 2, the atomizer nozzle comprises a tubular casing 1 having a discharge opening 2 surrounded by a frusto-conical rim or flange 3 whereby to form a bell shaped discharge port. A flexible conduit 4 attached to the rear end of the nozzle casing conducts air to the nozzle from the blower 5, which is designed to deliver air under pressure so as to deliver a discharge blast from the nozzle of considerable force to carry the discharge to the required distance.

Arranged concentrically of the discharge port 2 is a concial baffle plate 6 having a polished outer surface 6a and secured in spaced relation to the flange 3 by means of spacer webs whereby to form an annular passage and discharge port 8 and 9, respectively. In the embodiment illustrated, the angle of divergence of the baffle 6 is shown as being 90°, which angle has been found in practice to produce the most thorough atomizing and spreading action, but other angles might be used, of course, where advantageous as, for example, in the modification shown in Figures 3 and 4, in which a considerably smaller angle is used.

A liquid atomizer nozzle 10 is secured to the forward end of a pipe 11 within the nozzle casing and concentrically of the casing whereby the nozzle opening is in alignment with the apex of the baffle plate 6, so that the nozzle discharges uniformly against the sides of the baffle. The casing 1 is contracted inwardly adjacent the tip of the nozzle 10 in order to form a Venturi passage to assist in atomization of the liquid. The liquid insecticide is delivered to the nozzle under sufficient pressure to cause its atomization by means of a pipe 12 connected to the liquid pump 13 by means of a hose 14.

In operation it has been found that the atomized liquid discharged from the nozzle 10 onto the walls of the baffle 6 is further broken up by its impact with the baffle and further atomized or vaporized by the high velocity air stream sweeping over the polished sides of the baffle through the annular passage 8 and, consequently, it is desirable that the nozzle 10 be constructed so that the angular divergence of its discharge stream is less than that of the baffle 6, and that the nozzle be so spaced from the baffle that substantially the entire discharge strikes against the baffle walls, from where it is picked up by the air stream so that little or none of the atomized liquid is carried out of the casing without first striking against the baffle.

It is also desirable that the placement of the nozzle with respect to the baffle, and the character and angularity of its discharge stream is such that it strikes well down the side of the baffle, and in the embodiment illustrated substantially all of the discharge is shown as being spread over the baffle between its outer edge and approximately the midway point between its outer edge and apex. The reason for this is that it has been found in operation that the air stream apparently picks up the liquid particles from the baffle surface more readily the farther away from the apex they strike, and where the discharge from the nozzle strikes the baffle too near the apex the formation of drops of liquid is promoted, thereby preventing proper atomization and causing drippage from the end of the casing 1.

In the operation of the nozzle as described, it will be seen that the atomized liquid issuing from the nozzle 10 is further broken up into a more finely divided condition, and also partially vaporized, by reason of the provision of the baffle 6 against which the discharge from the nozzle 10 strikes, and from the polished surface of which the atomized liquid is swept by the high velocity air stream passing through the annular channel 8. Also, by reason of the conical shape of the discharge passage, the discharge from the nozzle diverges in conical form as it leaves the annular discharge port 9 whereby the insecticide is spread over a maximum area. By reason of the thorough atomization and partial vaporization of the insecticide and the discharge over a maximum area, its application to the trees or other objects being treated may be effected in the most economical and rapid manner.

I have found that for treating small bushes or vines which rise only a relatively short distance above the ground, a rectangular shaped nozzle may be used with more economical results than the circular one above described, for the reason that the angular divergence of the discharge in a vertical plane may be limited by the selection of a deflector plate of appropriate angle, without limiting the horizontal angle of divergence.

Figure 3:
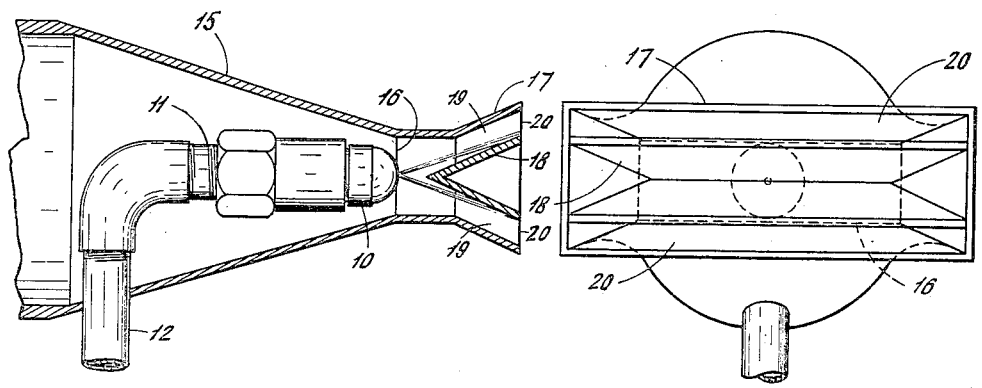
Figure 3 is a sectional elevation through a modified form of nozzle having a rectangular shaped discharge.
Figure 4:
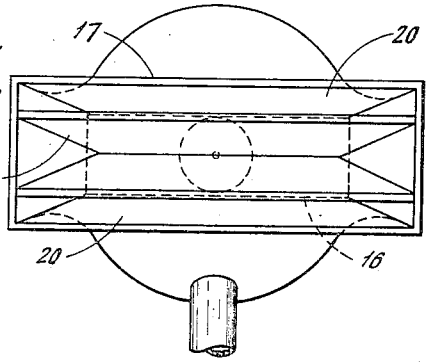
Figure 4 is an end elevation of the nozzle shown in Figure 3 as viewed from the right.
Figure 5:
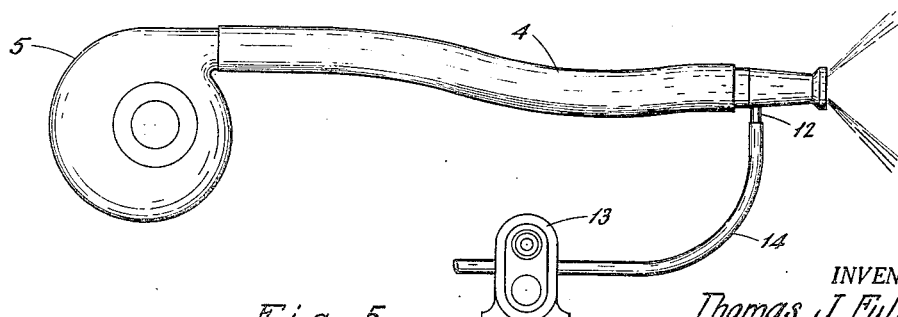
Figure 5 is a diagrammatical illustration of the nozzle showing the air and liquid supplies connected thereto.

In Figures 3 and 4 there is illustrated a nozzle of this character, in which the casing 15 is similar to that shown in Figure 1 except that it is flattened out towards its discharge end to provide a rectangular discharge port 16. The casing is also narrowed somewhat to provide a constricted passage adjacent the liquid atomizer nozzle 10 and a box like rim or flange 17 having outwardly flared walls as shown surrounds the discharge port 16. Centrally of the port is a wedge shaped deflector baffle 18 secured to the end walls of the flange 17 so that passage ways 19 are formed between the upper and lower sides of the flange and the inclined sides of the deflector, the passage ways terminating in rectangular discharge ports 20.

In all other respects the modification shown in Figures 3 and 4 is the same as that shown in Figures 1 and 2, the liquid atomizer nozzle 10 being constructed and positioned in the same as before so as to discharge atomized liquid against the deflector baffle in the same manner. The operation of the nozzle is also similar to that of circular form except that, as will be apparent, the angular divergence in a vertical plane is less and may be controlled within desired limits by varying the angularity of the deflector, without affecting the angle of divergence in a horizontal plane.

It will be understood that various modifications and changes may be made in the structures shown without departing from the spirit of the invention as, for example, means might be provided for varying the spacing of the baffles with respect to the surrounding flanges, or for varying the degree of fineness of the discharge from the nozzle 10, and I deem myself entitled to all such modifications and variations as fall within the scope of the claims appended hereto.

Having now described my invention and in what manner the same may be used, what I claim as new and desire to protect by Letters Patent is:

1. An atomizing nozzle comprising an air conducting casing having a discharge port, a deflecting baffle disposed centrally of said port and having divergent sides extending from an apex directed inwardly of the casing, said divergent baffle sides being spaced from the casing whereby to provide for the passage of air therebetween, a liquid atomizer nozzle disposed within the casing adjacent the apex of the baffle for discharging atomized liquid against the baffle sides, and conduits connected with the liquid atomizer nozzle and casing for supplying liquid and air respectively thereto under pressure.

2. A nozzle for discharging atomized liquids, comprising an open ended air conducting casing having a portion thereof flared outwardly adjacent the opening, a deflecting baffle disposed centrally of said opening and having divergent sides extending from an apex directed inwardly of the casing, said divergent baffle sides being substantially parallel with the flaring sides of the casing and spaced therefrom to provide for the passage of air therebetween, a liquid atomizer nozzle within the casing adjacent said deflecting baffle and in alignment with the apex thereof for discharging atomized liquid against the baffle, and separate conduits for supplying air and liquid under pressure, respectively, to the casing and the atomizer nozzle.

3. A nozzle for discharging atomized liquids, comprising an air conducting casing having a discharge port, a deflecting baffle disposed centrally of said port and having divergent sides extending from an apex directed inwardly of the casing, said divergent baffle sides being spaced from the edge of the orifice whereby to provide for the passage of air therebetween, a liquid atomizer nozzle disposed within the casing adjacent said baffle and in alignment with the apex thereof for discharging atomized liquid against the baffle, the position of the nozzle and the angle of divergence of the discharge therefrom being such that the entire discharge strikes the surface of the baffle, means for conducting liquid under pressure to the atomizer nozzle, and means for supplying air under pressure to the casing.

4. A nozzle for discharging atomized liquids comprising an open ended air conducting casing having a portion thereof flared outwardly adjacent the opening, a deflector baffle disposed centrally of the opening and having divergent sides extending from an apex directed inwardly of the casing, said divergent baffle sides being spaced from the casing whereby to provide for the passage of air therebetween, a liquid atomizer nozzle disposed within the casing adjacent said baffle and in alignment with the apex thereof for discharging atomized liquid against the baffle, the position of the nozzle and the angle of divergence of the discharge therefrom being such that substantially the entire discharge strikes the baffle beyond a point midway of its surface, means for supplying liquid under pressure to the atomizer nozzle, and means for supplying air under pressure to the casing.

5. An atomizing nozzle comprising an air conducting casing having a discharge orifice, a conical baffle disposed concentrically of said orifice and having its apex directed inwardly of the casing, means for spacing said baffle from the edge of the orifice whereby to form an annular discharge port, a liquid atomizer nozzle disposed within the casing adjacent said baffle for discharging atomized liquid against the baffle, and conduits connected with the atomizer nozzle and casing for supplying liquid and air respectively thereto under pressure.

6. An apparatus for discharging atomized liquids comprising an open ended air conducting casing, a frusto-conical flange surrounding the open end of said casing, a conical baffle disposed concentrically of the opening with its apex directed inwardly of the casing, means for spacing said baffle from the flange whereby to form an annular discharge passage, an atomizer nozzle within the casing arranged to discharge atomized liquid against the baffle, means for supplying liquid under pressure to said atomizer nozzle, and means for supplying air under pressure to said air conducting casing for discharge through the passage framed between the beveled rim and the conical baffle.

7. An atomizing nozzle comprising an air conducting casing having a rectangular discharge port, a wedge shaped deflector disposed centrally across said opening with its apex directed inwardly of the casing, means for holding said deflector with its inclined sides in spaced relation to the casing whereby to form air passages therebetween, a liquid atomizer nozzle within the casing adjacent the deflector and in alignment with the apex thereof for discharging atomized liquid against the deflector, and conduits connected with the liquid atomizer nozzle and casing for supplying liquid and air respectively thereto under pressure.

Signed at Fresno, California, this 15th day of June, A. D. 1932.

THOMAS J. FULTON.